United States Patent
Friedman

[15] 3,640,547
[45] Feb. 8, 1972

[54] COLLAPSIBLE SHOPPING CART

[72] Inventor: Abraham Friedman, 1228 45th Street, Brooklyn, N.Y. 11219

[22] Filed: Aug. 19, 1970

[21] Appl. No.: 65,107

[52] U.S. Cl. ..........................................................280/36 C
[51] Int. Cl. ................................................................B62b 11/00
[58] Field of Search..........................280/36 C, DIG. 4, 41 C

[56] References Cited

UNITED STATES PATENTS

| | | | |
|---|---|---|---|
| 2,947,546 | 8/1960 | Berlin | 280/41 C |
| 2,967,060 | 1/1961 | Berlin | 280/36 C |
| 2,969,988 | 1/1961 | Berlin | 280/36 C |
| 3,310,317 | 3/1967 | Luff | 280/36 C |
| 3,388,920 | 6/1968 | Hill | 280/41 R |

*Primary Examiner*—Leo Friaglia
*Assistant Examiner*—Robert R. Song
*Attorney*—Polachek & Saulsbury

[57] ABSTRACT

A collapsible shopping cart has a rectangular basket open at the top and closed at the bottom. The top of the basket has a rigid rectangular frame pivotally secured to vertical rear post carried by an axle provided with rotatable wheels. Vertical front legs are secured to the front of the frame. A handlebar is integral with lateral legs pivotally secured to sides of the frame and slidably engaging the bottom of the basket. The sides of the basket are formed by wire ribs arranged to flex outwardly at pivot joints at one or more sides of the basket. The bottom is a wire grid rotatably secured to the axle. Ends of the wire ribs can be rigidly joined together by welding.

15 Claims, 15 Drawing Figures

PATENTED FEB 8 1972 3,640,547
SHEET 1 OF 2
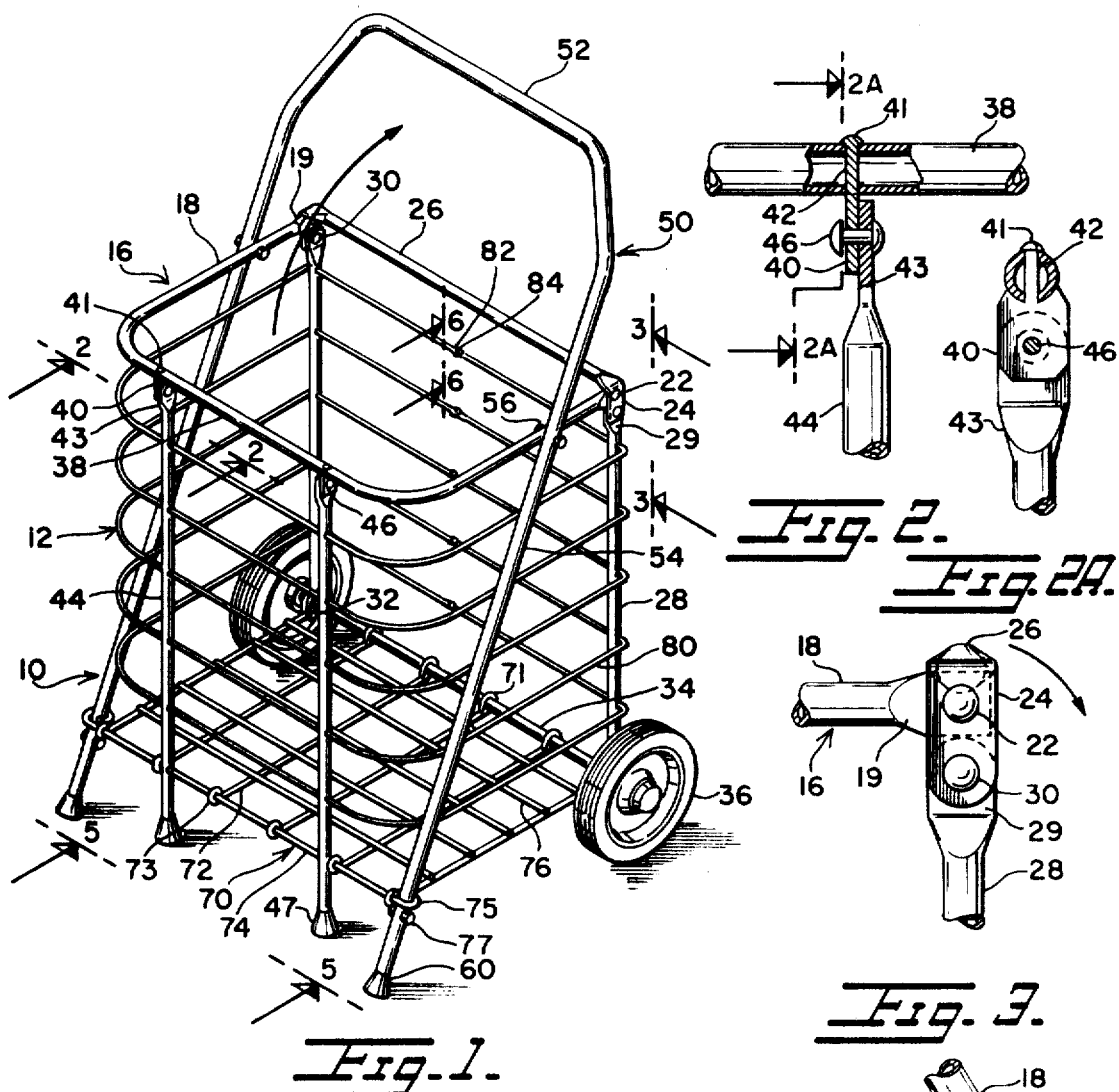
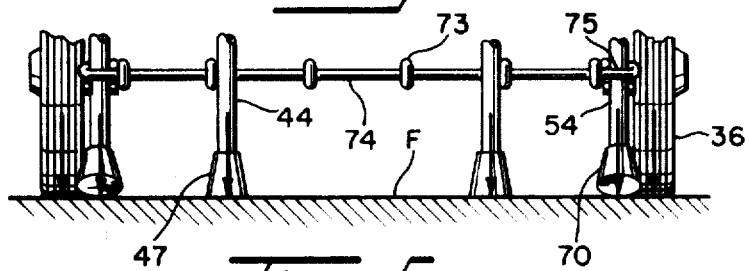
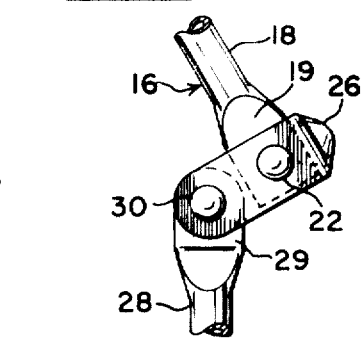
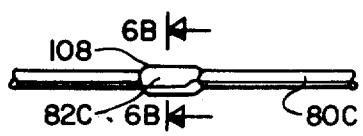
INVENTOR
ABRAHAM FRIEDMAN
Polachek & Saulsbury
ATTORNEY

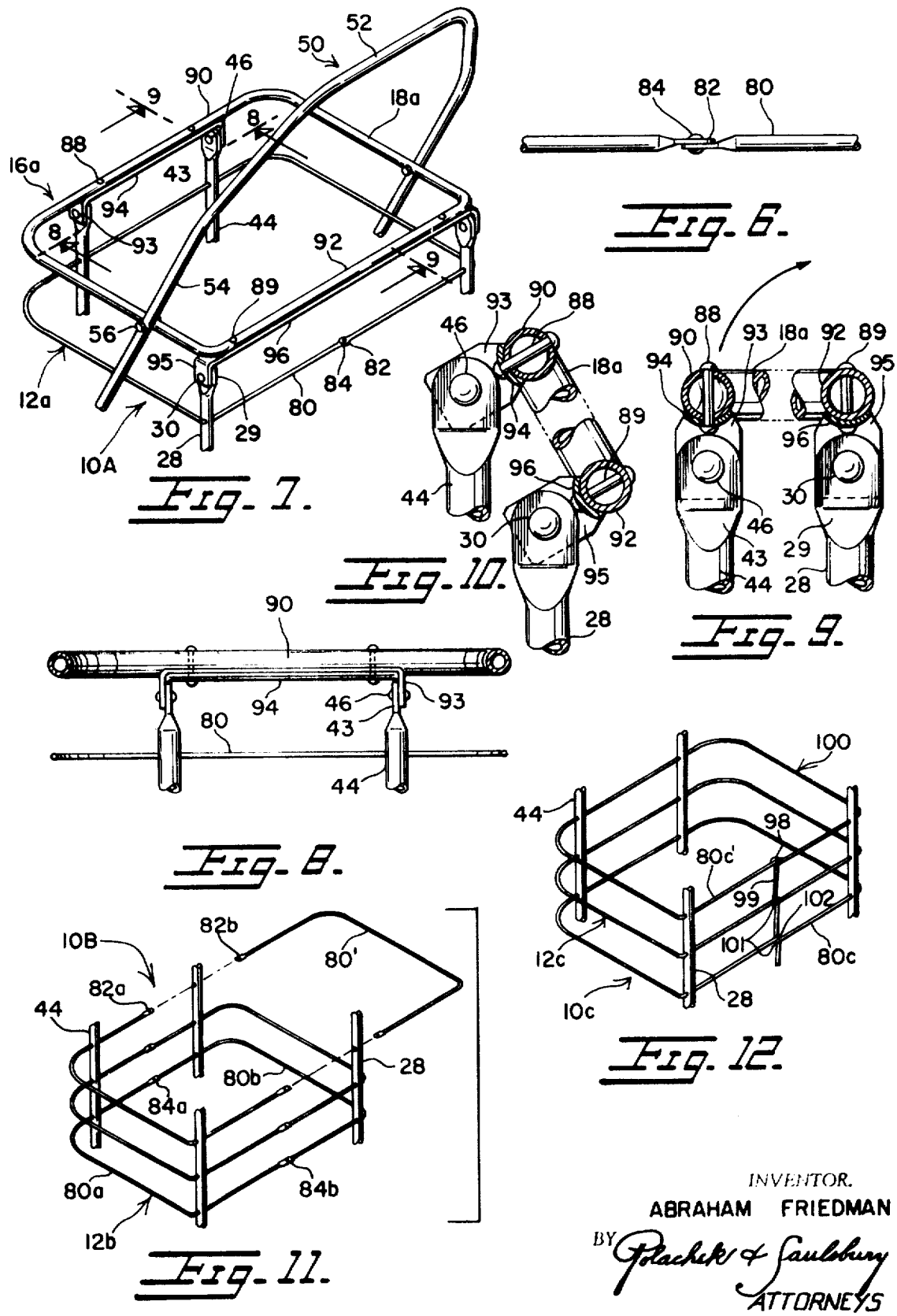

COLLAPSIBLE SHOPPING CART

This invention relates to the art of collapsible shopping carts and more particularly concerns an improved shopping cart having auxiliary legs, an expansible basket and a strong tubular top frame.

Collapsible shopping carts heretofore known have generally had a pair of rear wheels and a pair of inclined forwardly extending lateral legs to support a wire basket. Typical carts of this type are described in U.S. Pat. Nos. 3,207,526 and 3,236,635. It has been found in practice that such carts cannot be heavily loaded. The baskets become deformed because the basket wires twist and bend and the bottoms sag. Generally the sides of the baskets have thin ribs at the top which cannot withstand any great amount of pressure so that the tops of the baskets collapse if heavily loaded.

The present invention is directed at a shopping cart which overcomes the above and other difficulties and disadvantages of prior shopping carts. According to the invention, a shopping cart is provided with a rectangular, horizontal top frame to which is pivotally secured a pair of vertical front legs. The frame is pivotally secured to a pair of rear posts anchored to the rear axle of the cart. Rectangular horizontal ribs are threaded through the legs and posts to define a rectangular basket. The ribs have ends pivotally connected so that they yield to expand the basket when necessary to accommodate a larger than normal load. The cart has an inverted U-shaped tubular member which defines a top handle and a pair of inclined lateral legs. The lateral legs are pivotally connected to the top frame and provide supports for the rectangular ribbed bottom of the basket. The front legs are pivotally connected to the basket bottom and cooperate with the lateral legs in supporting the ribbed bottom.

Other and further features, objects and advantages of the invention will become apparent from the following detailed description taken together with the drawing, wherein:

FIG. 1 is a perspective view of a first collapsible shopping cart embodying the invention.

FIG. 2 is an enlarged fragmentary front view with parts broken away to show internal construction, taken on line 2—2 of FIG. 1.

FIG. 2A is a fragmentary sectional view taken on line 2A—2A of FIG. 2.

FIG. 3 is a fragmentary side elevational view of a corner portion of the cart, taken on line 3—3 of FIG. 1.

FIG. 4 is a view similar to FIG. 3, showing the position assumed by parts when the cart is collapsed.

FIG. 5 is an enlarged fragmentary front view taken on line 5—5 of FIG. 1.

FIG. 6 is an enlarged fragmentary horizontal view taken on line 6—6 of FIG. 1, showing parts of a rib of the basket structure.

FIG. 6A is a view similar to FIG. 6 showing another rib.

FIG. 6B is a cross section taken on line 6B—6B of FIG. 6A.

FIG. 7 is a fragmentary perspective view of part of a second collapsible shopping cart showing another frame construction.

FIG. 8 is an enlarged rear view of part of the frame of the second cart, taken on line 8—8 of FIG. 7.

FIG. 9 is an enlarged cross-sectional view with parts broken away taken on line 9—9 of FIG. 8, showing the cart in setup operative position.

FIG. 10 is a view similar to FIG. 9, showing the position assumed by parts of the cart when in collapsed or folded condition.

FIG. 11 is a perspective view partially exploded in form of a portion of a third collapsible shopping cart having another basket construction.

FIG. 12 is a fragmentary perspective view of a fourth shopping cart, having a further basket construction.

Referring first to FIGS. 1-6, there is shown a first shopping cart 10 having a basket 12 which is open at the top and closed at the bottom. At the top of the basket is a rigid rectangular top frame 16 formed by a tubular rectangularly U-shaped member 18. Ends 19 of lateral legs of member 18 are flattened and secured by rivets 22 to flattened perpendicularly bent ends 24 of rear tubular crossbar 26. Depending from the ends of crossbar 26 are two vertical posts 28. Upper ends 29 of these posts are flattened, rounded on top and pivotally secured by rivets 30 to bent ends 24 of the crossbar. Lower ends 32 of the posts 28 are flattened and apertured. Rear horizontal axle 34 extends through the apertured lower ends of posts 28. Wheels 36 are rotatably engaged on outer ends of axle 34.

Secured to the straight forward bight of bar 38 of frame member 18 in laterally spaced positions are two short brackets 40. These brackets have pins 42 extending through aligned holes in bar 38 and formed with heads 41; see FIGS. 1, 2 and 2A. Upper flattened ends 43 of legs 44 are pivotally secured by rivets 46 to brackets 40 and extend vertically downward. Bottom ends of the legs are provided with feet 47. Legs 44 support frame 16 in a horizontal position as shown in FIG. 1, when the cart is in fully open setup position.

Another tubular generally rectangular inverted U-shaped member 50 has a straight upper bight portion 52 which serves as a handlebar. Lateral legs 54 of member 50 are pivotally attached by pins 56 near rear ends of member 18. Legs 54 extend downwardly and forwardly and normally rest on the floor as shown in FIG. 1. Legs 54 are provided with bottom feet 60. The bottoms of legs 44 and 54 are all coplanar with bottoms of wheels 36. Thus basket 12 is supported on the floor F at six points as contrasted with conventional carts having four point supports.

The bottom 70 of the basket is defined by parallel wire ribs 72 extending forwardly between axle 34 and a straight front rib 74. Looped ends 71,73 ribs 72 rotatably engage axle 34 and rib 74. Cross-ribs 76 are welded to the ribs 72 to define a rigid rectangular wire grid. Ends of front rib 74 are formed into loops 75 which slidably encircle legs 54 and normally rest on cross pins 77 extending through these legs near their bottom ends. The front, sides and rear of the basket are formed by rectangular wire ribs 80 threaded through holes in legs 44 and posts 28. Ends 82 of ribs 80 are flattened horizontally and pivotally secured together by rivets 84; see FIG. 6.

When the cart is collapsed, the tubular rectangular frame 16 will turn. Member 18 will move upwardly clockwise as indicated in FIG. 3 to the position shown in FIG. 4. Bar 26 turns downwardly. The ends 24 of crossbar 26 will turn clockwise on rivets 30. Posts 28 will remain stationary. The ribs 80 will all turn upwardly in the holes in legs 44 and posts 28. The bottom grid 70 will also turn upwardly around axle 34 and front rib 74. The bottom grid will always remain parallel to the rectangular ribs 80. Legs 44 and 54 will rise upwardly with frame 16. By this arrangement the cart assumes a folded or collapsed position resting on wheels 36.

It will be apparent that the massive rigid top rectangular frame 16 prevents the basket from collapsing if a heavy load is placed upon this frame. Such a load will be supported by all four legs and the two posts. If a larger than normal load is placed in the basket, the basket will yield at the pivot joints defined by rivets 84 connecting the flattened ends 82 of ribs 80. The four legs and two posts provide six strong supports for heavy loads under which conventional wire shopping carts will buckle and collapse.

FIGS. 7-10 show another shopping cart 10A which is generally similar to cart 10 and corresponding parts are identically numbered. In cart 10A, the top frame 16a of basket 12a includes an endless rectangular tubular member 18a. Secured by rivets 88,89 underneath front and rear bars 90,92 of the top frame are channel shaped brackets 94,96. Ends 93 of bracket 94 are bent down and are pivotally engaged by rivets 46 with upper flattened ends 43 of vertical legs 44. Ends 95 of bracket 96 are bent downwardly and pivotally engage upper flattened ends 29 of posts 28 by means of rivets 30.

When the shopping cart 10A is collapsed from the position of FIG. 7,8 and 9 to the position of FIG. 10, the brackets 94,96 rotate with the rigid frame 16a. Ends 93 and 95 of the brackets remain parallel. Legs 44 move upwardly with legs 54 while posts 28 remain vertical and stationary.

In collapsible shopping cart 10B of FIG. 11, the basket 12*b* has legs 80' of U-shaped ribs 80*a*, 80*b* threaded through the holes in legs 44 and posts 28. Flattened ends 82*a*, 82*b* of the ribs are pivotally joined together by rivets 84*a*, 84*b* at front and rear sides of the basket. Other parts of the cart are the same as in cart 10 or 10A shown in FIGS. 1–10. Cart 10B has the advantage that the basket yields at both the front and rear to accommodate larger than normal loads.

Cart 10C of FIG. 12 has a basket 12*c* formed by threading a single wire 100 through holes in vertical front legs 44 and rear posts 28 to define horizontal ribs 80*c*. Loop or eye 98 is formed at the end of the wire on top rib 80*c*'. Another portion 99 of the wire is threaded through eye 98 and downwardly where it is bent at point 101 and turned horizontally. Each successive turn of wire forming one rectangular horizontal rib 80*c* is bent down at point 102' around the bend at point 101. This arrangement continues until all ribs 80*c* are formed. The bottom of the basket 12*c* and other parts of the cart 10C are the same as in carts 10, 10A or 10B. Basket 12*c* has the advantage of assembly from that a single wire 100 forms all ribs 80*c*. The ribs are flexible at bends 101, 102 so that the basket yields to accommodate large bulky loads.

From the foregoing description it will be apparent that the shopping carts share the common desirable feature of a strong rectangular top frame, six point supports for the basket provided by four legs and two posts supported by two wheels. The baskets are all expansible horizontally at the rear and may also be expansible at the front which is an important convenience feature. When the bulky loads are removed, the expanded pivotable rear or front rib portions spring back to normal, straight, aligned position.

FIGS. 6A and 6B show another rib structure. Here flattened ends 82*c* of ribs 80C are secured together by welding to form a rigid joint 108. Abutted ends of a single rib as shown in FIGS. 1 and 7, and abutted ends 82*a*, 82*b* of ribs 80*a*, 80*b* shown in FIG. 11 can be secured by welding to form rigid joints instead of the pivoted joint illustrated.

While a limited number of embodiments of the invention have been illustrated and described, it will be apparent that many variations and modifications are possible without departing from the invention.

What is claimed is:

1. A collapsible shopping cart, comprising a generally rectangular collapsible basket open at the top and closed at the bottom, with vertical front, rear and lateral sides; said basket having a rigid rectangular frame at the top horizontally disposed when the basket is open; a first pair of vertically disposed rigid legs pivotally secured to a front end of said frame; a pair of rigid vertical posts at rear of the basket, said frame being pivotally secured to upper ends of the posts at rear corners of the frame; a rigid horizontal axle supporting said posts at lower ends thereof; wheels rotatably engaged with said axle to support the basket at the rear while said legs support the basket at the front; a rigid horizontal handlebar over the basket; and a pair of other rigid legs integral with said handlebar and extending downwardly and forwardly parallel to each other at opposite sides of the basket, said frame being pivotally attached to said other legs at lateral sides of the frame, said bottom of the basket being slidably engaged with said other legs, and rotatably engaged with said first legs and said axle, said front, rear and lateral sides of the basket below said frame being defined by wire ribs threaded through holes in said first legs and posts, so that the basket is collapsible by rotating the basket with respect to said posts while elevating said first and other legs and said handlebar.

2. A collapsible shopping cart as defined in claim 1, wherein said frame has bracket means secured to the front thereof, upper ends of said first legs being pivotally secured to said bracket means.

3. A collapsible shopping cart as defined in claim 1, wherein said frame comprises a U-shaped member and a crossbar, said U-shaped member being secured to the crossbar, said crossbar having bent ends being pivotally secured to upper ends of the posts.

4. A collapsible cart as defined in claim 1, wherein said wire ribs are bent to individual substantially rectangular form, ends of the ribs being flattened and pivotally jointed together at one side of the basket so that said one side is expansible outwardly.

5. A collapsible cart as defined in claim 1, wherein said wire ribs are U-shaped members, pairs of said U-shaped members being pivotally secured together at opposite sides of the basket so that the basket is expansible outwardly at said opposite sides.

6. A collapsible cart as defined in claim 1, wherein said wire ribs are all portions of a single wire bent to form all sides of the basket.

7. A collapsible cart as defined in claim 1, wherein said frame comprises a U-shaped member secured at opposite ends near opposite ends of a crossbar, said crossbar having perpendicularly bent end portions, and bracket members secured to the bight of the U-shaped member, upper ends of the first legs being pivotally secured to said bracket members, said bent end portions of the crossbar being pivotally attached to the upper ends of the posts.

8. A collapsible cart as defined in claim 1, wherein said frame has bracket members secured to undersides of front and rear portions of the frame, said bracket members having downwardly bent end portions, upper ends of the first legs being pivotally attached to the end portions of one bracket member at the front of the frame, the end portions of the other bracket member being pivotally secured to the upper ends of the posts.

9. A collapsible cart as defined in claim 8, wherein said wire ribs are U-shaped members, pairs of said U-shaped members being pivotally secured together at opposite sides of the basket so that the basket is expansible outwardly at said opposite sides.

10. A collapsible cart as defined in claim 1, wherein said bottom of the basket comprises a grid of mutually perpendicular other wire ribs, some of said other wire ribs having loops at ends thereof rotatably engaging said axle, so that the bottom of the basket rotates on the axle when the basket is collapsed.

11. A collapsible cart as defined in claim 1, wherein the wire ribs are bent to individual substantially rectangular form, ends of the ribs being flattened and rigidly joined together at one side of the basket.

12. A collapsible cart as defined in claim 11, wherein the joined ends of the ribs are rigidly secured by welding.

13. A collapsible cart as defined in claim 1, wherein the wire ribs are U-shaped members, pairs of the U-shaped members being rigidly secured together at opposite sides of the basket.

14. A collapsible cart as defined in claim 8, wherein the wire ribs are U-shaped members, pairs of the U-shaped members having ends rigidly secured together at opposite sides of the basket.

15. A collapsible cart as defined in claim 14, wherein the rigidly joined ends of the U-shaped members are secured by welding.

* * * * *